B. VON BÜLTZINGSLÖWEN.
MEAT TENDERER.
APPLICATION FILED DEC. 21, 1914.
1,164,240.
Patented Dec. 14, 1915.
2 SHEETS—SHEET 1.
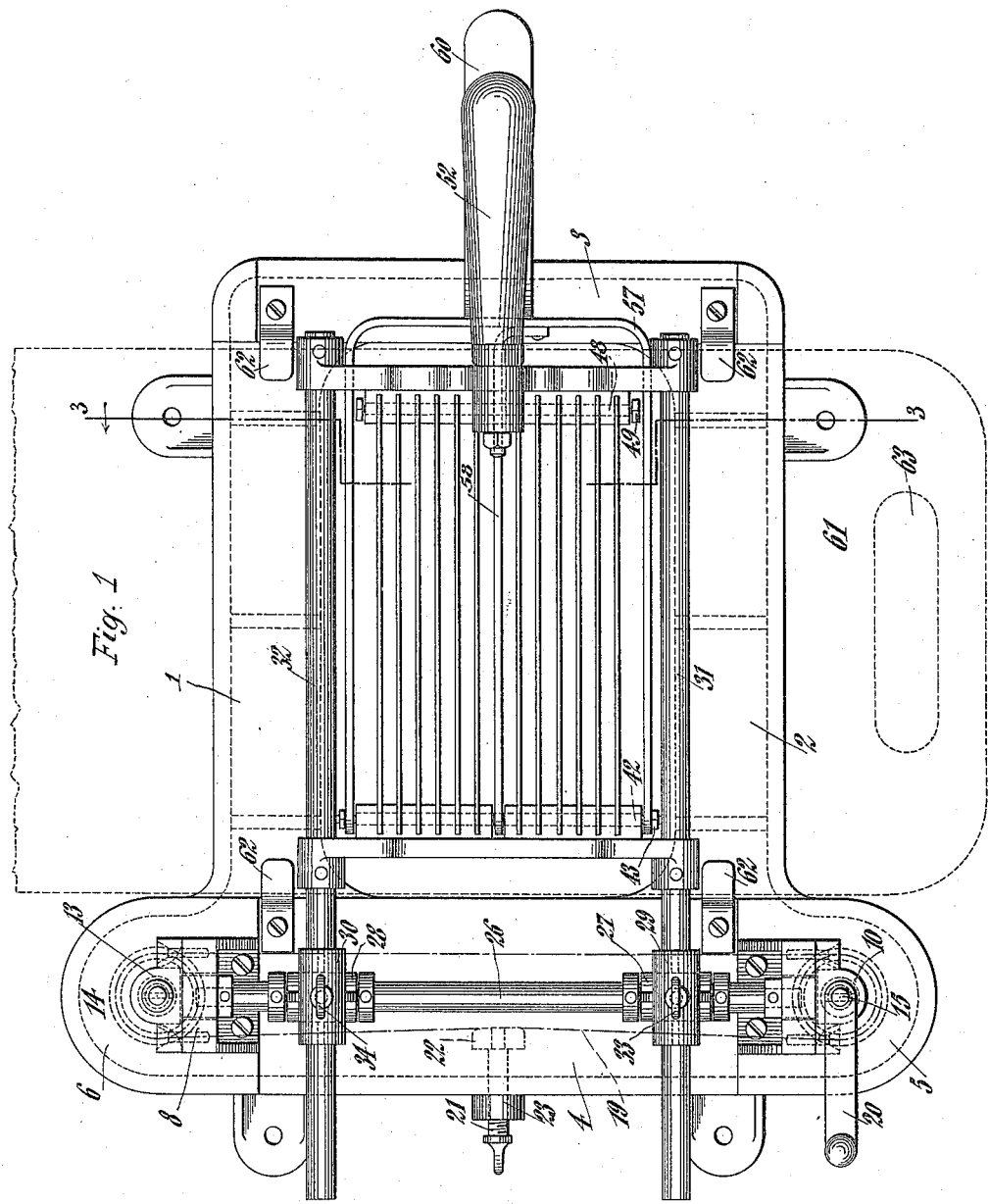
WITNESSES:
INVENTOR
Bruno von Bültzingslöwen
BY Carl P. Goepel
ATTORNEY

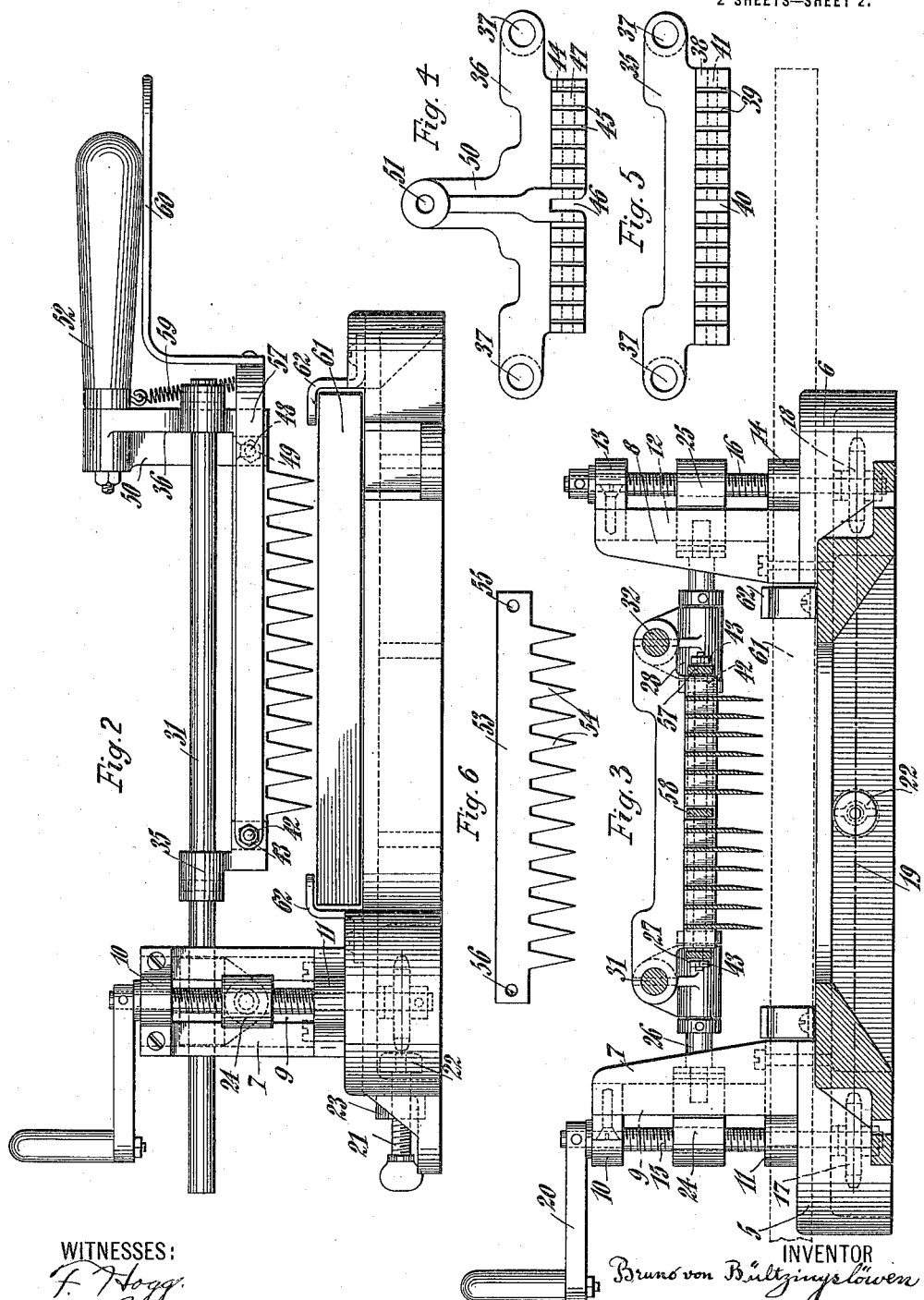

UNITED STATES PATENT OFFICE.

BRUNO VON BÜLTZINGSLÖWEN, OF NEW YORK, N. Y., ASSIGNOR, BY MESNE ASSIGNMENTS, TO ANNIE FREUND AND MINNIE FREUND, BOTH OF NEW YORK, N. Y.

MEAT-TENDERER.

1,164,240.            Specification of Letters Patent.      Patented Dec. 14, 1915.

Application filed December 21, 1914. Serial No. 878,370.

*To all whom it may concern:*

Be it known that I, BRUNO VON BÜLTZINGSLÖWEN, a subject of the German Empire, and resident of New York, borough of the Bronx, county of the Bronx, and State of New York, have invented certain new and useful Improvements in Meat-Tenderers, of which the following is a specification.

This invention relates to improvements in and relating to meat-tenderers, and has for its object to provide machines of this character by which meat may be conveniently, quickly and uniformly tendered by meat dealers or housewives.

Heretofore it has been necessary to tender meat with an ordinary rolling knife, requiring a great deal of time and wasted energy, with the result that the meat when tendered took on a most uninviting aspect, and was not efficiently done.

It is an object of the present invention to provide a tenderer which can be easily manipulated by a butcher's helper or housewife and effect a uniform and thorough tendering, such as could not be obtained by former methods.

Another object of my invention is to provide such a device which may be easily kept in a clean and sanitary condition by making the various parts capable of being easily disassembled, so that they may be cleaned or sharpened as required.

A further object is to provide such a device which is adjustable to various thicknesses of meat, and whereby after the meat has been treated it will be prevented from adhering to the blades.

With these and other objects in view, my invention consists of the novel features of construction, combination and arrangement of parts, as will be hereinafter more fully described, and particularly pointed out in the claims.

In the accompanying drawings, Figure 1 is a top plan view of my improved tenderer; Fig. 2 is a side elevation thereof; Fig. 3 is a transverse section on the line 3—3 of Fig. 1; Fig. 4 is a detail of one of the blade supporting means; Fig. 5 is a detail of the other blade supporting means; and, Fig. 6 is a detail of one of the blades.

Referring to the drawings, and more particularly to Fig. 1, my invention consists of a centrally apertured base comprising side portions 1 and 2, a front portion 3 and an enlarged rear portion 4 having outwardly extending ends 5 and 6. Upon this base is supported the tendering means hereinafter more fully described. The outwardly extending ends 5 and 6 are raised slightly above the plane of the other portions of the base to form platforms at the inner edges of which are secured the supports 7 and 8. A longitudinal slot 9 is provided in the support 7 and at each end thereof are outwardly extending bearing members 10 and 11. The support 8 is provided in the same way with a slot 12 and bearing members 13 and 14. Supported in the bearing members of the supports 7 and 8 are screws 15 and 16, having their ends extending below the extended portions 5 and 6 of the base, and provided at their ends with toothed wheels 17 and 18. A sprocket chain 19 embraces the toothed wheels 17 and 18, so that by rotation of the screw 15, the screw 16 is simultaneously rotated and vice versa. A crank handle 20 is provided at the end of the screw 15 for rotating the same. In order to vary the tension of the sprocket chain 19, a screw 21 having a head 22 adapted to bear against the chain is provided in the rear portion of the base and is threaded into the extension 23 thereof.

Internally threaded heads 24 and 25 engaged by the slots 9 and 12 of the supports 7 and 8 are supported on the screws 15 and 16 respectively, and are adapted to be given rectilinear motion by the rotary motion of the screws. Pivotally mounted between the heads 24 and 25 is a bar 26, upon which are mounted sleeves 27 and 28 approximately at each end thereof, and capable of adjustment longitudinally on said bar, and mounted on the sleeves 27 and 28 are sleeves 29 and 30 at right angles thereto, in which are supported the tilting rods 31 and 32. These rods 31 and 32 are capable of adjustment forwardly and backwardly by loosening of the winged nuts 33 and 34 provided in the sleeves 29 and 30.

Blade supporting members 35 and 36

(shown in detail in Figs. 4 and 5) provided at each end with apertures 37, are supported between the tilting rods 31 and 32 in spaced relation in front of the bar 26. The supporting member 35 has a forwardly extending portion 38 in which are provided a plurality of blade supporting grooves 39, and centrally thereof is a larger groove 40 for supporting the center portion of a yoke member, hereinafter more fully described, the end portions of said yoke member being supported at the ends of the supporting member 35. A hole 41 extends transversely through the grooved portion of the supporting member, and is adapted to receive a rod 42 provided on each end with nuts 43 for locking the blades and yoke member in position. The supporting member 36 has a downwardly extending portion 44 of less width than the portion 38 of the supporting member 34 to allow for clearance of the yoke member, and is provided also with a plurality of blade supporting grooves 45 and a central larger groove 46 extending through the same. A hole 47 is provided transversely extending through the grooved portion adapted to receive a rod 48 having nuts 49 screwed on each end for locking the blades in position. An upwardly extending portion 50 is provided on the supporting member 36 having a hole 51 in which is secured a lifting handle 52.

The blade members, which are supported between the members 35 and 36 comprise a metal strip 53 having a saw toothed edge 54 and provided at each end with apertures 55 and 56 adapted to register with the holes 41 and 47 of the supporting members and are secured in position by the rods 42 and 48 thereof. By removing the said rods the blades may be readily removed for cleaning or sharpening as desired. The blades may also be mounted on a holder adapted to be readily secured to and detached from the supporting members 35 and 36, so that when desired all of the blades may be simultaneously removed, to be sharpened and replaced by another set; or blade shaped projections may be provided on a single plate adapted to be secured to and removed from the supporting members in the same manner.

A yoke member 57 having a center arm 58 is pivotally secured to the supporting member 35 at each end, and centrally thereof in the groove 40. A tension spring 59 is secured between the yoke member and the handle 52, adapted to hold the same against the forward supporting member 36, the center groove 46 being provided therein, and the sides recessed to receive the center arm and side arms thereof respectively. A handle 60 is provided on the yoked member for swinging the same away from the cutting blades, the tension spring 59 automatically returning the same to position when the handle is released.

A meat supporting board 61, preferably of wood, is slidably supported on the base directly under the cutting blades, and is prevented from sidewise play by the guide lugs 62 provided on the base. An aperture 63 may be provided in the board 61 for conveniently manipulating the same.

The operation of my device is as follows: The meat is placed on the board 61 directly under the cutting blades and the same are raised or lowered according to the thickness of the meat to be made tender by operation of the crank handle 20. The yoke handle 60 is firmly held down against the meat with one hand and with the other the handle 52 is raised and lowered, thereby bringing the blades into contact with the meat. When it is desired to turn the meat, both handles are lifted and the meat turned as desired. By this means the meat is effectively and uniformly tendered, in the quickest time, and a device is provided which may be always kept in perfect working and sanitary condition.

I have illustrated preferred and satisfactory forms of my invention, but it is obvious that different shaped blades from those illustrated may be used and other changes made, without departing from the spirit and scope thereof, except as may be required by the claims.

I claim:—

1. In a meat-tenderer, vertical supporting members provided with vertical slots therein, a shaft engaging at its ends the said slots, means engaging the ends of said shafts adapted to raise and lower the said shaft with respect to the supporting member, tendering means pivotally mounted on the said shaft, and a yoke member pivotally mounted on the said tendering means and surrounding the same and adapted to be operated independently therefrom.

2. In a meat-tenderer, vertical supporting members provided with vertical slots therein, a shaft engaging at its ends the said vertical slots, screws engaging the ends of the said shaft, means connecting the said screws to make the same simultaneously operative by operation of one, to raise and lower the said shaft, tendering means pivotally mounted on the said shaft, and a yoke member pivotally mounted on said tendering means and surrounding the same and adapted to be operated independently therefrom.

3. In a meat-tenderer, vertical supporting members provided with vertical slots therein, a shaft engaging at its ends the said vertical slots, screws engaging the ends of the said shaft, adapted to raise and lower the same and to securely hold the same at any position between its extreme upward and downward movement, tendering means pivotally mounted on the said shaft, and a yoke member pivotally mounted on the said tendering means and surrounding the same and adapted to be operated independently therefrom.

In testimony, that I claim the foregoing as my invention, I have signed my name in presence of two subscribing witnesses.

BRUNO von BÜLTZINGSLÖWEN.

Witnesses:
C. P. GOEPEL,
F. HOGG.

Copies of this patent may be obtained for five cents each, by addressing the "Commissioner of Patents, Washington, D. C."